(12) United States Patent
Mizumoto et al.

(10) Patent No.: US 9,196,312 B2
(45) Date of Patent: Nov. 24, 2015

(54) DISK DRIVE WITH AIR-FLOW CONTROL COMPONENT

(75) Inventors: Naoshi Mizumoto, Kanagawa (JP);
Masaki Otsuka, Kanagawa (JP);
Satoshi Suzuki, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 1283 days.

(21) Appl. No.: 12/630,807

(22) Filed: Dec. 3, 2009

(65) Prior Publication Data

US 2010/0134920 A1    Jun. 3, 2010

(30) Foreign Application Priority Data

Dec. 3, 2008    (JP) .................................. 2008-309173

(51) Int. Cl.
*G11B 5/54* (2006.01)
*G11B 21/22* (2006.01)
*G11B 33/14* (2006.01)

(52) U.S. Cl.
CPC .................................... *G11B 33/148* (2013.01)

(58) Field of Classification Search
CPC .................................................... G11B 33/148
USPC ...................... 360/97.01–97.02, 254.8, 255.7
See application file for complete search history.

(56) References Cited

U.S. PATENT DOCUMENTS

| | | | |
|---|---|---|---|
| 5,241,438 A * | 8/1993 | Matsushima | 360/254.8 |
| 6,078,474 A * | 6/2000 | Koyanagi et al. | 360/254.8 |
| 6,275,356 B1 * | 8/2001 | Boutaghou et al. | 360/254.8 |
| 6,473,271 B1 | 10/2002 | Rahman et al. | |
| 6,600,625 B1 * | 7/2003 | Munninghoff et al. | 360/97.02 |
| 6,903,899 B2 | 6/2005 | Sakata et al. | |
| 7,072,140 B2 | 7/2006 | Asano et al. | |
| 7,944,644 B2 | 5/2011 | Kaneko et al. | |
| 2002/0036862 A1 | 3/2002 | Tsang et al. | |
| 2002/0149876 A1 * | 10/2002 | Sakata et al. | 360/97.02 |
| 2004/0120071 A1 | 6/2004 | Akama et al. | |
| 2005/0041332 A1 * | 2/2005 | Chan et al. | 360/97.02 |
| 2005/0185324 A1 | 8/2005 | Suwa et al. | |
| 2006/0028760 A1 * | 2/2006 | Zuo et al. | 360/97.02 |
| 2006/0221802 A1 * | 10/2006 | Hayakawa et al. | 369/219.1 |
| 2007/0130578 A1 | 6/2007 | Ido et al. | |
| 2009/0002880 A1 * | 1/2009 | Ueda et al. | 360/97.02 |

FOREIGN PATENT DOCUMENTS

| | | |
|---|---|---|
| JP | 2002-313061 | 10/2002 |
| JP | 2003-085941 | 3/2003 |
| JP | 2003346443 | 12/2003 |
| JP | 2004234784 | 8/2004 |

(Continued)

*Primary Examiner* — Adam B Dravininkas

(57) ABSTRACT

A disk drive. The disk drive includes a motor, a base to which the motor is affixed, an actuator supporting a head-slider, and an air-flow control component affixed inside the base. The motor is configured to spin a disk. The actuator is configured to access the disk and to rotate about a pivot shaft to move the head-slider. The air-flow control component includes a plate which faces a recording surface of the disk, and a support portion supporting the plate. The thickness of the plate gradually decreases towards an outflow side of the air-flow control component. The bodies of the plate and the support portion are made of resin; and, a surface of the plate is configured to be held at an electrical potential selected from the group consisting of ground potential and a negative potential.

16 Claims, 7 Drawing Sheets

(56) References Cited

FOREIGN PATENT DOCUMENTS

| | | |
|---|---|---|
| JP | 2006-040363 | 2/2006 |
| JP | 2006-344291 | 12/2006 |
| JP | 2008-077700 | 4/2008 |
| JP | 2008090874 | 4/2008 |

* cited by examiner

DISK DRIVE WITH AIR-FLOW CONTROL COMPONENT

CROSS-REFERENCE TO RELATED APPLICATION

This application claims priority from the Japanese Patent Application No. 2008-309173, filed Dec. 3, 2008, the disclosure of which is incorporated herein in its entirety by reference.

TECHNICAL FIELD

Embodiments of the present invention relate to a disk drive, and in particular, relates to air-flow control components such as an air-flow spoiler, or alternatively, a disk damper, for head-slider positioning accuracy that restrict airflow.

BACKGROUND

Data-storage devices using various kinds of media, such as optical disks and magnetic tapes, are known in the art. In particular, hard disk drives (HDDs) have been widely used as data-storage devices for contemporary computer systems. Moreover, HDDs have found widespread application to motion picture recording and reproducing apparatuses, car navigation systems, cellular phones, and similar devices relying on data storage, in addition to the computers, because of their outstanding information-storage characteristics.

Magnetic-recording disks used in HDDs include multiple concentric data tracks and servo tracks disposed discretely in the circumferential direction of the magnetic-recording disk. User data is recorded in units of data sectors; and, a data sector is recorded between servo sectors. A rotary actuator moves a head-slider in proximity with the recording surface of a spinning magnetic-recording disk. A magnetic-recording head of the head-slider accesses a designated data sector in accordance with position information indicated by servo data to write data to the data sector, or alternatively, to read data from the data sector.

A head-slider includes the magnetic-recording head, which is affixed to a slider of the head-slider. The head-slider is secured to the rotary actuator. The slider flies in proximity to the recording surface of the spinning magnetic-recording disk; and, the actuator positions the head-slider, which includes the magnetic-recording head, at a designated radial position on the magnetic-recording disk. In reading data, the signal read back from the magnetic-recording disk by the magnetic-recording head undergoes predetermined signal processing such as waveform shaping and decoding with a signal processing circuit; and, the read-back signal is then transmitted to a host. Also, data transferred from the host undergo predetermined processes by the signal processing circuit to produce a write signal; and, the write signal is then written to the magnetic-recording disk.

Engineers and scientists engaged in HDD manufacturing and development are interested in the methods and systems for reading data from, and writing data to, the magnetic-recording disk of the HDD that meet the rising demands of the marketplace for increased data-storage capacity, performance, and reliability.

SUMMARY

Embodiments of the present invention include a disk drive. The disk drive includes a motor, a base to which the motor is affixed, an actuator supporting a head-slider, and an air-flow control component affixed inside the base. The motor is configured to spin a disk. The actuator is configured to access the disk and to rotate about a pivot shaft to move the head-slider. The air-flow control component includes a plate which faces a recording surface of the disk, and a support portion supporting the plate. The thickness of the plate gradually decreases towards an outflow side of the air-flow control component. The bodies of the plate and the support portion are made of resin; and, a surface of the plate is configured to be held at an electrical potential selected from the group consisting of ground potential and a negative potential.

DESCRIPTION OF THE DRAWINGS

The accompanying drawings, which are incorporated in and form a part of this specification, illustrate embodiments of the invention and, together with the description, serve to explain the embodiments of the present invention.

Figure 1:
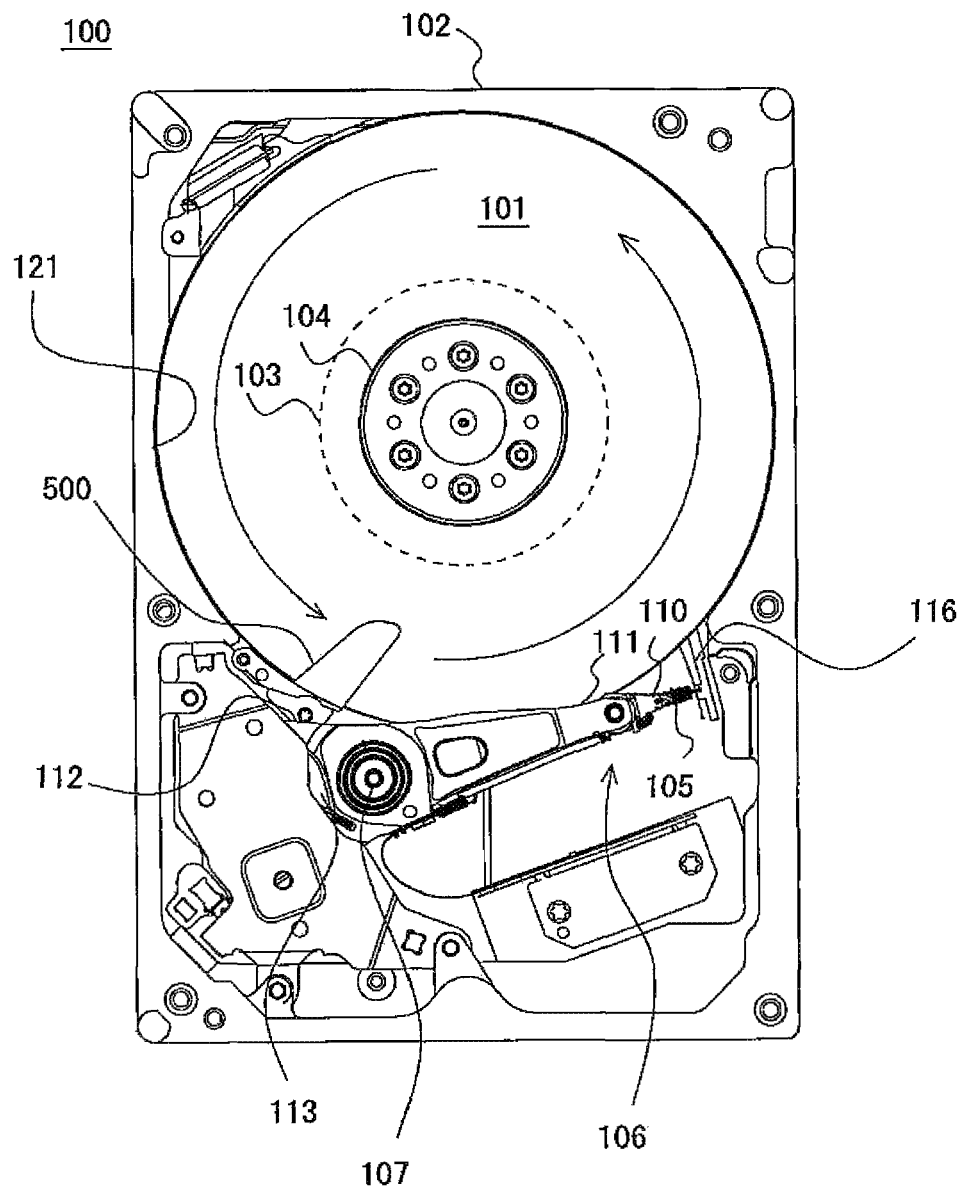
FIG. 1 is an example top view schematically depicting a configuration of a hard-disk drive (HDD), in accordance with an embodiment of the present invention.

The drawings referred to in this description should not be understood as being drawn to scale except if specifically noted.

DESCRIPTION OF EMBODIMENTS

Reference will now be made in detail to the alternative embodiments of the present invention. While the invention will be described in conjunction with the alternative embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following description of embodiments of the present invention, numerous specific details are set forth in order to provide a thorough understanding of the present invention. However, it should be noted that embodiments of the present invention may be practiced without these specific details. In other instances, well known methods, procedures, and components have not been described in detail as not to unnecessarily obscure embodiments of the present invention. Throughout the drawings, like components are denoted by like reference numerals, and repetitive descriptions are omitted for clarity of explanation if not necessary.

Description of Embodiments of the Present Invention for a Disk Drive with an Air-Flow Control Component With relevance to embodiments of the present invention, in a hard-disk drive (HDD), airflow generated by the spin of a magnetic-recording disk is an issue. For example, the airflow causes an actuator to sway, which disturbs accurate positioning of a head-slider. In addition, vibration of the magnetic-recording disk, which is referred to by the term of art, "disk flutter," caused by the turbulence of the airflow generated by the spin of the magnetic-recording disk is another issue. The disk flutter disturbs accurate positioning of the head-slider to a track, as well as the sway of the head-slider. Such vibration caused by airflow is referred to by the term of art, "flow-induced vibration," or "FIV."

For HDDs, suppression of FIV has been consistently performed to increase head-slider positioning accuracy. In particular, as recording density on a magnetic-recording disk has increased to attain higher tracks per inch (tpi), more accurate head-slider positioning is utilized; and thus, suppression of disk flutter is becoming a greater issue.

To control the FIV characteristic in an HDD, an air-flow control component having a plate facing a magnetic-recording disk is known in the art. For example, a HDD in which an air-flow spoiler is disposed upstream of the actuator is known in the art. The air-flow spoiler spoils the air flowing toward the actuator positioned in proximity with the recording surface of the magnetic-recording disk to reduce the turbulence that buffets the magnetic-recording head. The air-flow spoiler spoils airflow in proximity to the magnetic-recording disk to suppress the disk flutter.

Around the periphery of the outside-diameter edge of a magnetic-recording disk, there is relatively much particulate debris deposited or floating in the airflow because of the presence of a head-stack assembly (HSA), as well as other components. Together with the airflow caused by the spin of the magnetic-recording disk, particulate debris is directed toward the air-flow spoiler. In addition, downstream of the air-flow spoiler, Karman vortices are generated. This turbulence of airflow causes particulate debris to attach to the surface of the magnetic-recording disk downstream of the air-flow spoiler.

A typical conventional air-flow spoiler is made of resin. The resin allows highly precise and efficient manufacturing of the air-flow spoiler. To damp the vibration caused by airflow, the air-flow spoiler has a specific stiffness; typically, the air-flow spoiler is made of polyimide resin, or alternatively, polycarbonate resin. Such resin spoilers are insulators, so that resin spoilers may be charged by contact with an HDD assembler, or alternatively, by other components in the manufacturing process during assembly of the HDD. Within the drive, such resin spoilers possess positive charge on the order of several tens of volts.

The particulate debris in the drive is charged positively. Accordingly, particulate debris drawn to between the wing of the air-flow spoiler and the magnetic-recording disk is repelled by the positive charge of the air-flow spoiler and is moved toward the magnetic-recording disk. Moreover, the magnetic-recording disk opposite to the wing of the air-flow spoiler becomes charged negatively, through electrical induction with an induced charge, because of the positively charged wing of the air-flow spoiler. Therefore, the particulate debris repelled from the air-flow spoiler is likely to stick to the negatively charged magnetic-recording disk. If a head-slider passes in proximity to the recording surface of a magnetic-recording disk with particulate debris attached to the head-slider, the particulate debris gets caught between the head-slider and the magnetic-recording disk, so that the magnetic-recording disk may be damaged and lose recorded data and/or the magnetic-recording head of the head-slider may be damaged.

In accordance with embodiments of the present invention, a disk drive includes a motor configured to a disk, a base to which the motor is affixed, an actuator supporting a head-slider, such that the actuator is configured to access the disk and to pivot about a pivot shaft to move the head-slider, and an air-flow control component. In accordance with embodiments of the present invention, the air-flow control component is affixed inside the base and includes a plate that faces a recording surface of the disk and such that a thickness of the plate gradually decreases towards an outflow side of the air-flow control component, and a support portion supporting the plate; the bodies of the plate and the support portion are made of resin and a surface of the plate is configured to be held at an electrical potential selected from the group consisting of ground potential and a negative potential. Thus, in accordance with embodiments of the present invention, the air-flow control component may reduce the amount of particulate debris that may be deposited on the surface of the disk.

In one embodiment of the present invention, the air-flow control component is made of conductive resin by integral molding. Thus, in one embodiment of the present invention, the amount of particulate debris to be deposited on the surface of the disk may be reduced and an air-flow control component having a designated stiffness may be manufactured efficiently. In another embodiment of the present invention, the plate includes an end surface connecting a plate upper surface with a plate undersurface at the rear end of the plate. Thus, in an embodiment of the present invention, this structure provides an increase in the accuracy and yields in manufacturing the air-flow control components.

In one embodiment of the present invention, the plate upper surface and the plate undersurface of the plate include respective tapered surfaces that are tapered in such a manner that the thickness gradually decreases with proximity to the outflow side. Thus, in an embodiment of the present invention, Karman vortices downstream may be effectively suppressed and the amount of particulate debris to be deposited on the surface of the disk may be reduced. In another embodiment of the present invention, an inflow end surface of the plate includes a groove extending in a radial direction of the disk. Thus, in an embodiment of the present invention, this configuration spoils rapid airflow entering between the plate and the disk and reduces the amount of particulate debris that may be deposited on the surface of the disk.

In another embodiment of the present invention, the plate upper surface and the plate undersurface of the plate include respective roughened portions. Thus, in an embodiment of the present invention, the Karman vortices downstream may be effectively suppressed and the amount of particulate debris to be deposited on the surface of the disk may be reduced. In another embodiment of the present invention, the support portion is disposed opposite to an outside-diameter edge of the disk and includes an inner wall having a shape in conformity with the outside-diameter edge of the disk. Thus, in an embodiment of the present invention, disk flutter may be suppressed. In another embodiment of the present invention, the plate and the support portion may include a layer on respective surfaces selected form the group consisting of a plated metal layer and a coating layer configured to acquire a negative charge. Thus, in an embodiment of the present invention, the surfaces may be adapted to possess a designated potential.

In accordance with embodiments of the present invention, air-flow control components for controlling the FIV characteristics may reduce particulate debris attached to a disk. Embodiments of the present invention are subsequently described in the environment of a HDD, as an example of a disk drive. In accordance with embodiments of the present invention, a HDD includes an air-flow control component for controlling airflow generated by the spin of a magnetic-recording disk of the HDD. In accordance with embodiments of the present invention, the air-flow control component is an air-flow spoiler having a wing-shaped relatively small plate to face the magnetic-recording disk, or alternatively, a disk damper having a relatively large plate to be disposed at a location opposite to the magnetic-recording disk. In one embodiment of the present invention, the air-flow spoiler, or alternatively, the disk damper, is configured so as to gradually decrease in the thickness at the air outflow end. Thus, in accordance with embodiments of the present invention, the configuration may suppress Karman vortices downstream to prevent particulate debris from being deposited on the surface of the magnetic-recording disk including between the plate and the magnetic-recording disk.

In another embodiment of the present invention, the plate of the air-flow control component possesses a property that the surface of the plate of the air-flow control component is conductive, or alternatively, may become negatively charged. In accordance with an embodiment of the present invention, such an electrical property of the surface of the air-flow control component may suppress attraction of positively charged particulate debris to a magnetic-recording disk between the air-flow control component and the magnetic-recording disk. In another embodiment of the present invention, on the surface of the air-flow control component, the material may be the same as that of the body of the air-flow control component; or alternatively, the surface of the air-flow control component may be made of a different material from that of the body of the air-flow control component.

In another embodiment of the present invention, the body of the air-flow control component, which includes a plate and a support portion for supporting the plate, is made of resin, so that the body of the air-flow control component may be manufactured with high precision and efficiency. In accordance with an embodiment of the present invention, if the surface of the air-flow control component is made of the same material as that of the body of the air-flow control component, the air-flow control component is made of conductive resin, or alternatively, a negatively chargeable resin. In accordance with an embodiment of the present invention, to attain a designated stiffness and electrical property, the air-flow control component is made of conductive resin. In another embodiment of the present invention, if the surface and the body of the air-flow control component are made of different materials, the material for the surface may be plated metal, as well as the above-mentioned conductive resin, or alternatively, the above-mentioned negatively chargeable resin. Alternatively, in yet another embodiment of the present invention, the resin body may be coated so as to be negatively chargeable.

In accordance with embodiments of the present invention, an air-flow spoiler as an example of an air-flow control component is subsequently described; and, a disk damper is subsequently described as another example of an air-flow control component. In accordance with embodiments of the present invention, before providing detailed descriptions of the air-flow spoiler, the configuration of a HDD in which the air-flow spoiler is mounted is next described.

With reference now to FIG. 1, in accordance with embodiments of the present invention, a top plan view is shown that schematically depicts the configuration of HDD 100. In FIG. 1, a disk enclosure (DE), housing constituent elements of HDD 100, includes a base 102 for housing constituent elements of the HDD 100 that is secured with a top cover (not shown) for covering the top opening of the base 102 with a gasket interposed between the base 102 and the cover.

A magnetic-recording disk 101 is mounted on a hub of a spindle motor 103 and is sandwiched between a screw-clamped top clamp 104 and the hub, so that the magnetic-recording disk 101 is secured to the spindle motor 103 (indicated by the dashed circle in FIG. 1). In one embodiment of the present invention, the HDD 100 includes three magnetic-recording disks; and, FIG. 1 shows the uppermost magnetic-recording disk 101. In another embodiment of the present invention, the air-flow spoiler may be applicable to a HDD having a greater number of magnetic-recording disks than shown in FIG. 1.

The spindle motor 103 is affixed within the bottom of the base 102 and spins the magnetic-recording disk 101 at a specific speed. In FIG. 1, the magnetic-recording disk 101 spins counterclockwise (as indicated by the arrows). An actuator 106 holds head-sliders 105 at the distal end of the actuator 106. A head-slider 105 includes a slider and a magnetic-recording head as a transducer element affixed to the slider body. The magnetic-recording head writes data to, and/or reads data from, the magnetic-recording disk 101. The magnetic-recording head includes a write element for converting an electrical signal into a magnetic field in accordance with storage data for the magnetic-recording disk 101 and a read element for converting a magnetic field from the magnetic-recording disk 101 into an electrical signal.

The actuator 106 includes a suspension 110, an arm 111, a coil support 112, and a flat coil 113, which are connected in this order from distal end of the actuator 106 where the head-slider is disposed. A VCM rotates the actuator 106 in the lateral direction of the actuator 106, which is nominally the radial direction of the magnetic-recording disk, around a pivot shaft 107 by the driving current fed through the flat coil 113 in accordance with a control signal from a controller (not shown). Thus, the actuator 106 moves the head-slider 105 in proximity with the recording surface of the magnetic-recording disk 101 along the nominally radial direction of the recording surface of the magnetic-recording disk, or to the outside of and away from the magnetic-recording disk 101. Thus, the head-slider 105 may access a designated track, which includes reading data from, or writing data to, the designated track.

The pressure between the flying surface of the slider facing the magnetic-recording disk 101 and the spinning magnetic-recording disk 101 balances the force applied by a suspension 110 toward the magnetic-recording disk 101 so that the head-slider 105 may fly in proximity to the recording surface of the magnetic-recording disk 101. Before the magnetic-recording disk 101 stops spinning, the actuator 106 moves the head-slider 105 from a data area to a ramp 116, which operation is referred to by the term of art, "unloading." On the other hand, the actuator 106 leaves the ramp 116 and moves in proximity to the magnetic-recording disk 101, which operation is referred to by the term of art, "loading." In accordance with embodiments of the present invention, the HDD includes a loading and unloading scheme including the ramp 116; but, embodiments of the present invention may be applied to a contact start and stop (CSS) scheme in which the head-slider is moved to a zone disposed in proximity to the inside-diameter area of the magnetic-recording disk 101.

A portion of the inner wall of the base 102 forms a shroud 121, which is arc-shaped in conformity with the outside-diameter edge of the magnetic-recording disk 101. The shroud 121 reduces the gap between the outside-diameter edge of the magnetic-recording disk 101 and the inner wall of the base to suppress disk flutter. The gap between the shroud 121 opposite to the outside-diameter edge of the magnetic-recording disk 101 and the outside-diameter edge of the magnetic-recording disk 101 is substantially uniform.

In addition, in the base 102, an air-flow spoiler 500 is disposed between a downstream of the shroud 121 and an upstream of the actuator 106 to reduce the speed of airflow, which is generated by the spin of the magnetic-recording disk 101, and which flows in the rotational direction. Specifically, the air-flow spoiler 500 is located near the coil support 112 of the actuator 106.

With reference now to FIGS. 2(a) and 2(b), in accordance with embodiments of the present invention, perspective views are shown that schematically depict the structure of the air-flow spoiler 500. FIG. 2(a) is a drawing of the outflow end of the air-flow spoiler 500 when viewed from an upper side. FIG. 2(b) is a drawing of the inflow end of the air-flow spoiler 500 when viewed from a lower side. The lower portion of the air-flow spoiler 500 is secured to the bottom surface of the base 102. As described herein, the bottom of the base 102 is defined as a lower side; and, the top cover is defined as an upper side. In the structural example of FIGS. 2(a) and 2(b), the air-flow spoiler 500 includes three wings 501a, 501b, and 501c disposed so as to face the recording surfaces of respective magnetic-recording disks. In addition, the air-flow spoiler 500 includes a support portion 502 for supporting the wings 501a to 501c. The wings 501a to 501c are plates for controlling airflow in proximity to the magnetic-recording disks.

The support portion 502 includes a through-hole 521 and is affixed to the bottom of the base 102 with a screw that passes through the support portion 502. In assembling an HDD 100, the magnetic-recording disks are mounted in the HDD; the air-flow spoiler 500 is disposed within the base and temporarily secured with a screw; and then the support portion 502 is rotated around the screw to move the wings 501a to 501c to the position overlapped with the magnetic-recording disks.

The wings 501a to 501c project from the inner face of the support portion 502, which is the face opposite to the outside-diameter edge of the magnetic-recording disks, so as to be a plurality of tiers stacked in the upper-lower direction, which is the direction of the pivot shaft of the actuator, or the SPM spindle shaft. The uppermost wing 501a is located in proximity to the top surface of the uppermost magnetic-recording disk 101 and is inserted between the magnetic-recording disk 101 and the top cover. The second wing 501b is disposed between the first, which is the uppermost, magnetic-recording disk 101 and the second magnetic-recording disk.

The lowermost, which is the third, wing 501c is inserted between the second magnetic-recording disk, which is the middle, magnetic-recording disk, and the third magnetic-recording disk, which is the lowermost, magnetic-recording disk. Between the lowermost magnetic-recording disk and the bottom of the base, a wing is not disposed. This is because the surface opposite to the magnetic-recording disk is a stationary wall so that the speed of the airflow is slow, so there is a little effect of air turbulence buffeting even in the absence of a wing. From the same reason, in proximity to the uppermost magnetic-recording disk, a wing 501a is not disposed.

In an embodiment of the present invention, the air-flow spoiler 500 is configured so that the surface of the air-flow spoiler 500 has ground, or alternatively, a negative potential, namely no more than the ground potential. The configuration prevents the negative charge from being induced on the magnetic-recording disk by the air-flow spoiler 500 and suppresses deposition of positively charged particulate debris onto the magnetic-recording disk 101.

Typically, the air-flow spoiler 500 is made of resin including carbon fiber, which is a carbon-fiber reinforced plastic. The air-flow spoiler 500 is in contact with a metal base 102 so that the potential on the surface of the air-flow spoiler 500 falls to the ground potential. In an embodiment of the present invention, for purposes of manufacturing and the electrical properties of the air-flow spoiler 500, the whole air-flow spoiler 500 is made of conductive resin; but, a portion of the air-flow spoiler 500 including the wings 501a to 501c may be made of conductive resin; and, the other portion may be made of insulating resin in a two-color molding process. In another embodiment of the present invention, the portion of the air-flow spoiler 500 including the wings 501a to 501c includes the inner face 522 of the support portion 502 in addition to the wings 501a to 501c. In this structure, the portion of conductive resin including the wings 501a to 501c is electrically connected to the base 102.

The air-flow spoiler 500 may include a plated metal layer on the surface of the internal resin body. A typical plated metal layer is a stainless steel layer. Contact of the plated metal layer to the base 102 allows the electrical charge to reliably escape to the base 102. Similar to the structure using conductive resin, the plated metal layer does not cover the whole surface of the air-flow spoiler 500. A portion of the surface including the wings 501a to 501c covered with a plated metal layer prevents particulate debris from depositing onto the magnetic-recording disk.

In another example, an air-flow spoiler 500 is made of resin which has a tendency to acquire a negative charge, becoming negatively charged. For the resin material, liquid crystal polymer may be used. Since particulate debris inside the drive is positively charged, if the inductive charge of a magnetic-recording disk is positive, deposition of particulate debris on the magnetic-recording disk may be suppressed. If resin which tends to be negatively charged is used, the whole, or an appropriate portion, of the air-flow spoiler 500 is made of resin similar to the above-described conductive resin.

In this way, if the whole air-flow spoiler 500 is made of one or more kinds of resin materials, or the wings 501a to 501c and the body of the support portion 502 are made of resin, and the surfaces of the wings 501a to 501c and the body of the support portion 502 are plated, the air-flow spoiler 500 may possess the above-described specific electrical property and may be manufactured with high precision and efficiency.

To suppress the deposition of particulate debris onto the magnetic-recording disk caused by the air-flow spoiler 500, the structure of magnetic-recording disk is further designed to provide other functions in addition to the above-described electrical property. At the downstream of the wings 501a to 501c of the air-flow spoiler 500, deposition of particulate debris onto the surface of the magnetic-recording disk is caused by Karman vortices. Therefore, the airflow downstream of the wings 501a to 501c is shaped to prevent the particulate debris from gathering around the wings 501a to 501c including space between the wings 501a to 501c and the magnetic-recording disk 101.

Figure 3:
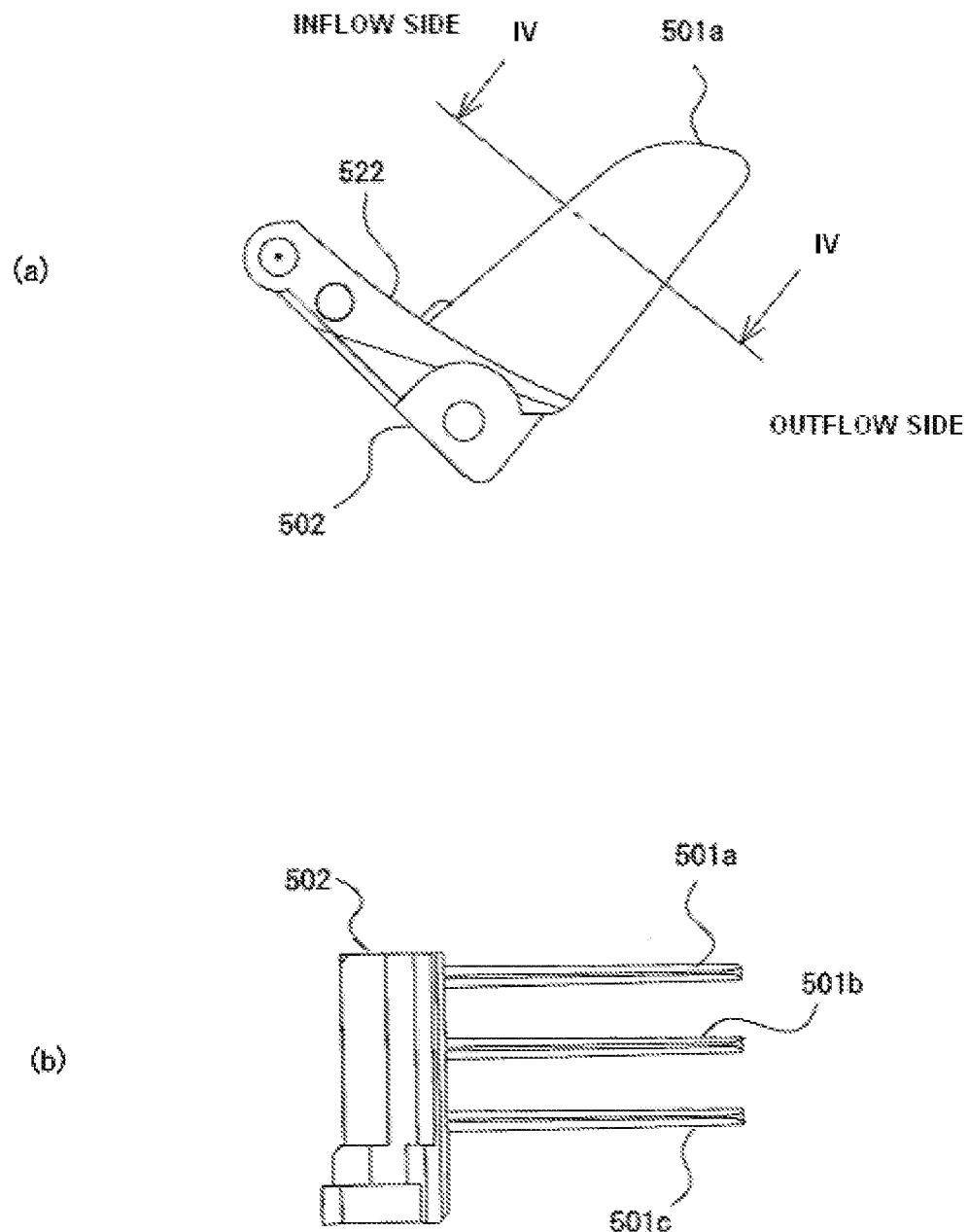
FIGS. 3($a$) and 3($b$) are an example top view of the air-flow spoiler and an example side view showing the outflow end, which is the rear end downstream, of the air-flow spoiler, in accordance with an embodiment of the present invention.

With reference now to FIGS. 3(a) and 3(b), in accordance with embodiments of the present invention, the structure of the air-flow spoiler 500, in particular, the shape of the wings 501a to 501c is next described. FIG. 3(a) is a top view of the air-flow spoiler 500 and FIG. 3(b) is a side view showing the outflow end, which is the rear end downstream, of the air-flow spoiler 500. As shown in FIG. 3(a), the inner wall 522 of the support portion 502 opposite to the outside-diameter edges of magnetic-recording disks is curved in conformity with the outside-diameter edge of the magnetic-recording disk 101 (refer to FIG. 1).

Figure 2:
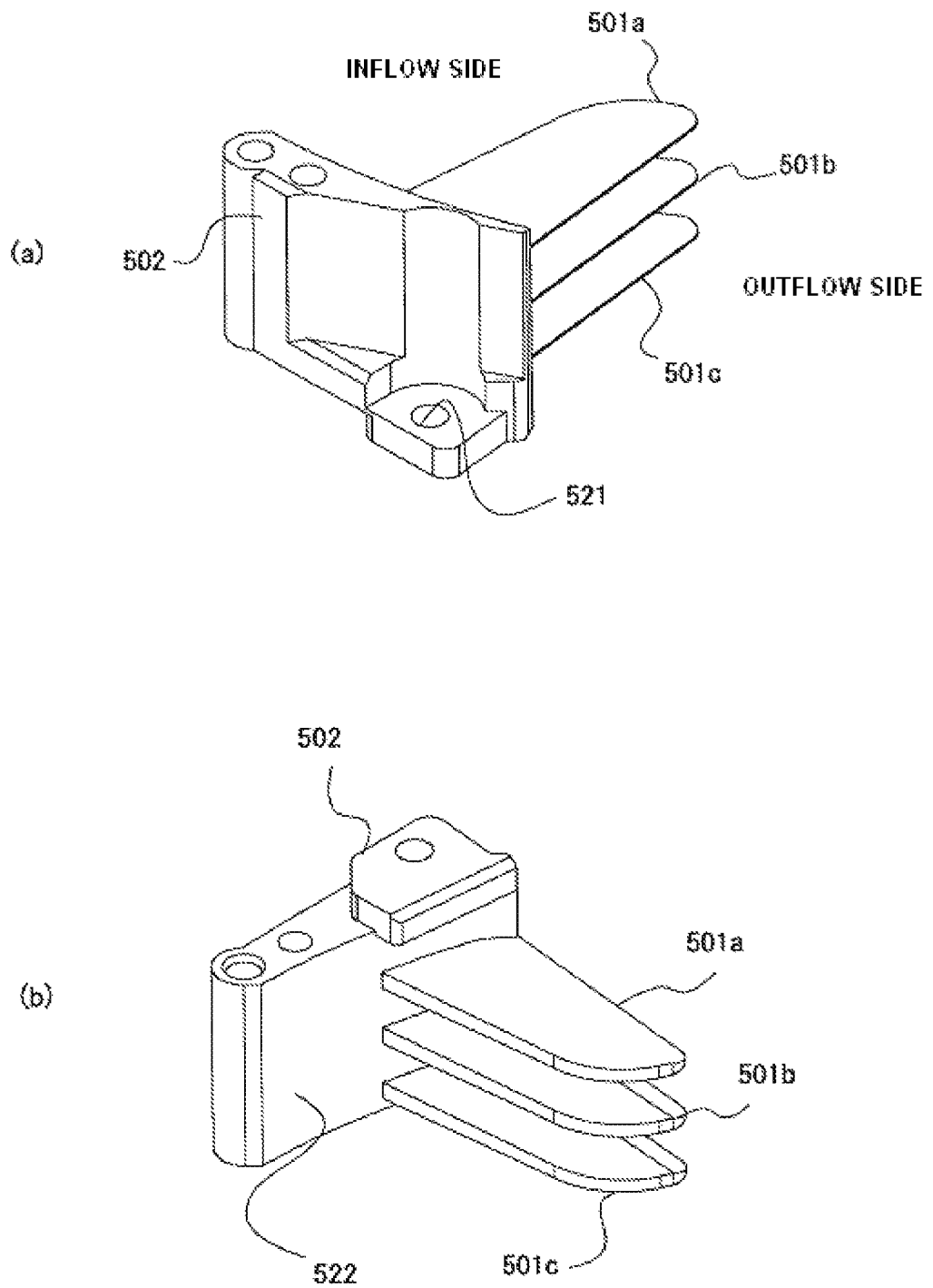
FIGS. 2($a$) and 2($b$) are example perspective views schematically depicting the structure of an air-flow spoiler, in accordance with an embodiment of the present invention.

The inner wall 522 is, as shown in FIG. 2, stands in parallel with the spindle shaft of the SPM 103. The inner wall 522 is disposed near the outside-diameter edge of the magnetic-recording disk 101 and the spacing between the outside-diameter edges of the magnetic-recording disks and the inner wall 522 is substantially uniform in the circumferential direction of the magnetic-recording disk. Accordingly, the support portion 502 suppresses flutter of the magnetic-recording disks, in similar fashion to the shroud 212 of the base 102. The wings 501a to 501c and the inner wall 522 may increase the effect on the FIV characteristics of the air-flow spoiler 500 as a single component.

As shown in FIG. 3(a), the wings 501a to 501c are formed elongated in such a manner that the width of the wing, which is the dimension in the flowing direction of air, decreases from the outside-diameter edge of the magnetic-recording disk, from the inner wall 522 of the support portion, toward the inside diameter of the magnetic-recording disk 101. As shown in FIG. 3(b), the wings 501a to 501c decrease in thickness downstream on the outflow side of the wings 501a to 501c.

Figure 4:
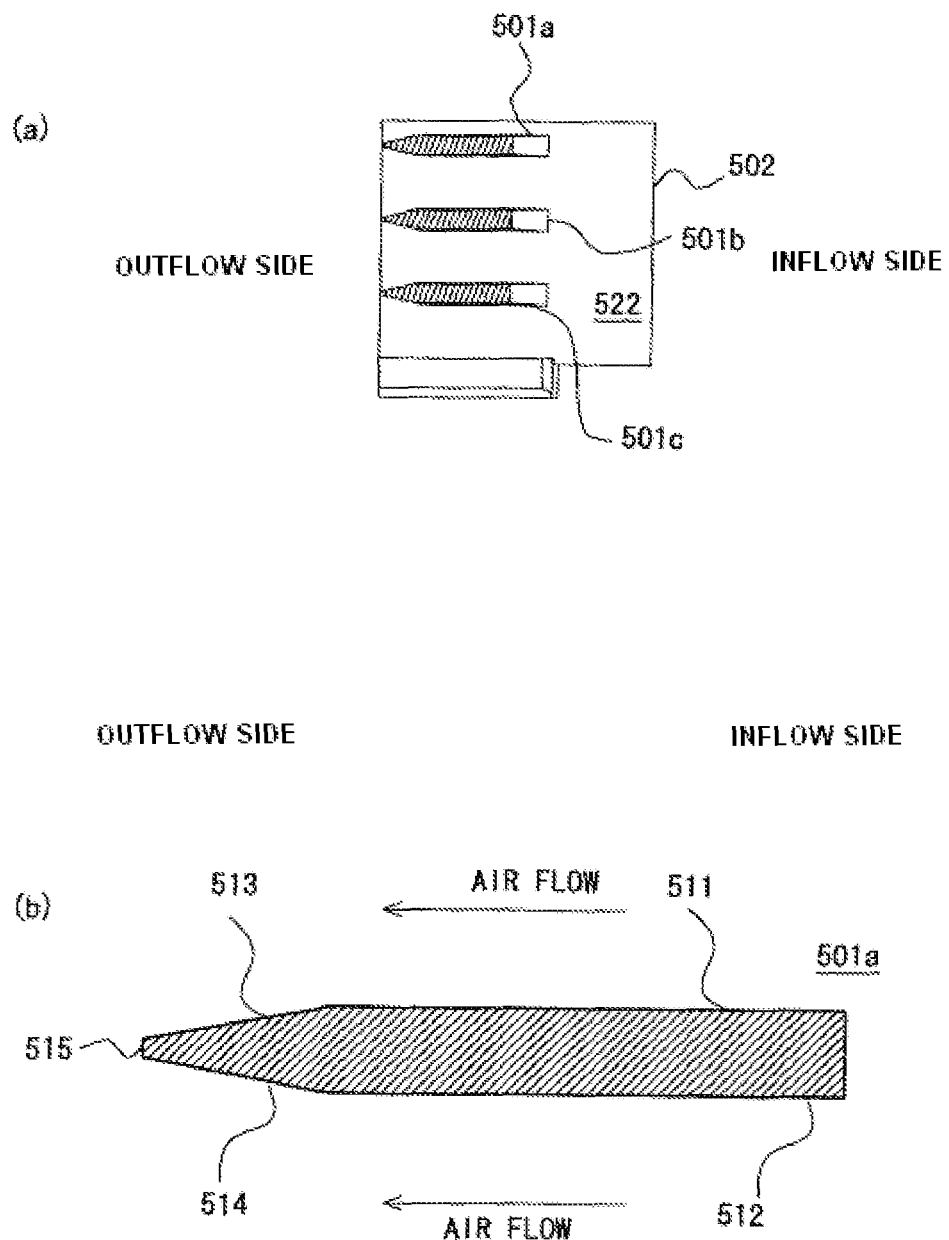
FIGS. 4($a$) and 4($b$) are an example view showing the cross-sections of wings cut along line IV-IV of FIG. 3($a$) and the side of the air-flow spoiler, and an example cross-sectional view of a wing cut along line IV-IV of FIG. 3($a$), in accordance with an embodiment of the present invention.

With reference now to FIGS. 4(a) and 4(b), in accordance with embodiments of the present invention, a side view of the air-flow spoiler 500 is shown in FIG. 4(a) including the cross-section of the wings 501a to 501c cut along the line IV-IV in FIG. 3(a); and, in FIG. 4(b), a cross-sectional view of the wing 501 is shown cut along the line IV-IV in FIG. 3(a). In FIGS. 4(a) and 4(b), air flows from the right towards the left; the left of the air-flow spoiler 500 is the inflow side; the right of the air-flow spoiler 500 is the outflow side; and, the wings 501a to 501c possess the same shape. The shape of the wing 501a is next described.

As seen in FIG. 4(b), the cross-section of the outflow side of the wing 501a gradually narrows downstream. The wing 501a includes an inflow top surface 511 elongated horizontally in the air-flow direction, which is parallel to the recording surface of the magnetic-recording disk, and an inflow undersurface 512. Both the inflow top surface 511 and the inflow undersurface 512 are horizontal; and, the thickness of the wing 501a between the inflow top surface 511 and the inflow undersurface 512 is uniform in the air-flow direction.

The wing 501a includes a tapered top surface 513 and a tapered undersurface 514 on the outflow side, which is the downstream side, of the wing 501a. The tapered top surface 513 and the inflow top surface 511 are continuous; and, the tapered undersurface 514 and the inflow undersurface 512 are continuous. The wing top surface of the wing 501a includes the tapered top surface 513 and the inflow top surface 511; and, the wing undersurface of the wing 501a includes the tapered undersurface 514 and the inflow undersurface 512. The tapered top surface 513 and the tapered undersurface 514 are linearly sloping from upstream towards downstream. Accordingly, the distance between the tapered top surface 513 and the tapered undersurface 514, which is the thickness of the wing 501a, decreases linearly from upstream towards downstream at a constantly decreasing rate. In this way, the decrease in thickness of the wing 501a on the outflow side results in reduction in Karman vortices downstream of the wing 501a, suppressing draw of particulate debris.

In accordance with embodiments of the present invention, the shape of the wing 501a is such that the wing 501 includes an outflow end surface 515, which is a rear end face. Typically, the outflow end surface 515 is vertical, which is parallel to the spindle axis. The tapered top surface 513 and the tapered undersurface 514 are not directly joined together, but the outflow end surface 515 connects the tapered top surface 513 with the tapered undersurface 514. Hence, there is a thickness, associated with the outflow end surface 515, at the outflow end of the wing 501a. Thus, in accordance with embodiments of the present invention, the manufacturing accuracy at the outflow end of the wing 501a and the manufacturing yield of the air-flow spoiler 500 may be increased.

In one embodiment of the present invention, to reduce Karman vortices downstream, the wing 501a possesses both the tapered top surface 513 and the tapered undersurface 514; alternatively, the wing 501a may have only one of the tapered top surface 513 and the tapered undersurface 514. In accordance with embodiments of the present invention, the top side and the underside of the cross-section of the outflow side of the wing 501a are not limited to a linear tapered form, as in the above-described example. For example, the top side and the underside may possess rounded shapes, such as an outwardly convex arc, or alternatively, an inwardly convex arc. The inflow top surface 511 and the inflow undersurface 512 may be curved, or alternatively, tapered, instead of horizontal depending on the design. In another embodiment of the present invention, the wing top surface and the wing undersurface of the wing 501a may be partially roughened. The roughened surface of the wing 501a provides a turbulent boundary layer on the surface, which reduces Karman vortices downstream of the air-flow spoiler 500, which is next described.

Figure 5:
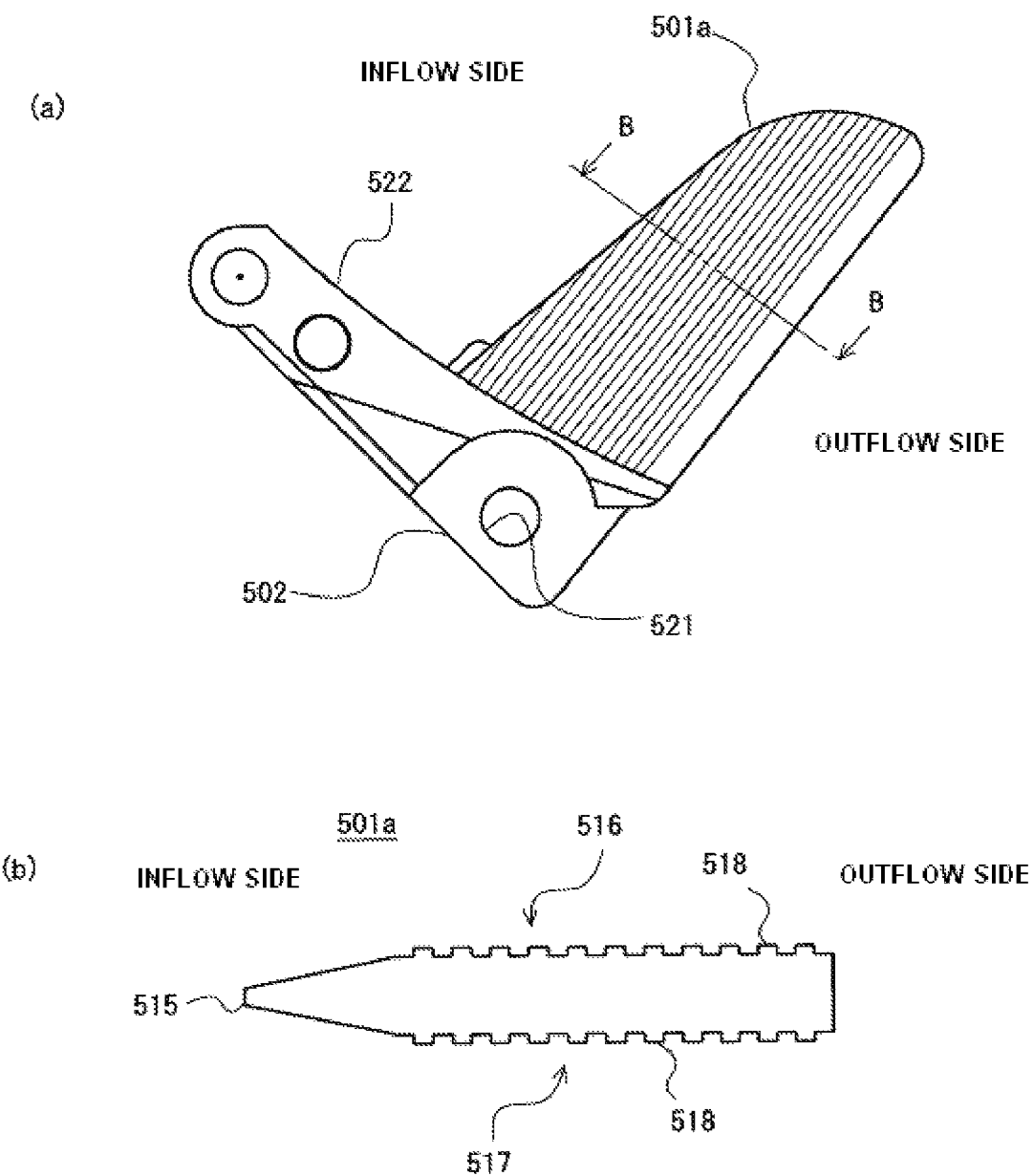
FIGS. 5($a$) and 5($b$) are example drawings schematically depicting a wing of the air-flow spoiler having a roughened surface, in accordance with an embodiment of the present invention.

With reference now to FIGS. 5(a) and 5(b), in accordance with embodiments of the present invention, drawings are shown that illustrate a shape of the wing 501 having a roughened surface. FIG. 5(a) is a top view of the air-flow spoiler 500; and, FIG. 5(b) is a cross-sectional view of the wing 501a cut along the line B-B in FIG. 5(a). On the wing top surface 516 and the wing undersurface 517 of the wing 501a, a plurality of ridges 518, which are associated with grooves, extend in the direction crossing airflow. The plurality of ridges 518 are parallel to one another and extend in the direction from the outside diameter toward the inside diameter of the magnetic-recording disk 101. In this way, a plurality of ridges 518 arranged along the direction of the airflow allows effective formation of a turbulence boundary layer. In an embodiment of the present invention, the ridges are formed on both the wing top surface 516 and the wing undersurface 517, but may also be formed on either one alone. Moreover, the way of roughing the wing top surface 516 and the wing undersurface 517 may include formation of a plurality of dimples, or alternatively, a number of small columns on the top surface 516 and the undersurface 517.

The above-described configurations attempt to reduce Karman vortices downstream through the shape of the outflow side of the wing 501a. The causes of particulate debris entering between the wing 501a and the magnetic-recording disk 101 include: air flowing from the upstream to between the wing 501a and the magnetic-recording disk 101, as well as Karman vortices downstream. Spoiling such airflow leads to reduction of particulate debris intruding to between the wing 501a and the magnetic-recording disk 101, which is next described.

Figure 6:
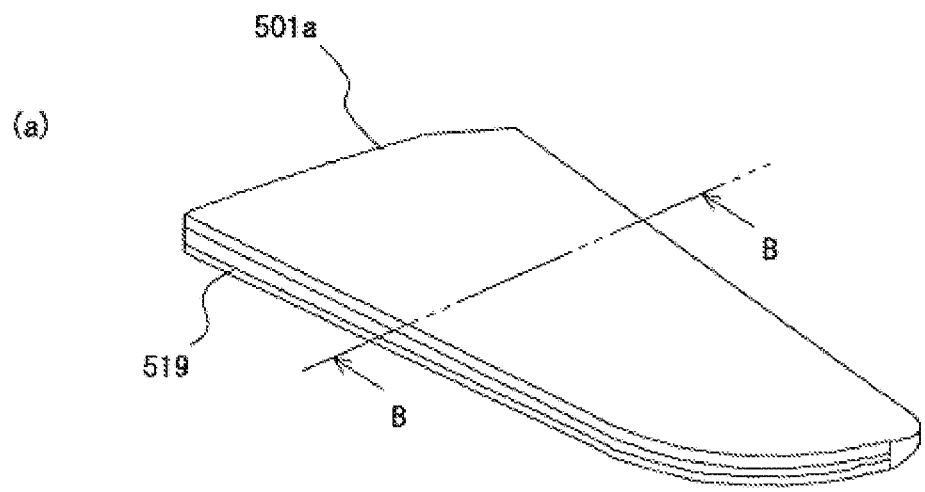
FIGS. 6($a$), 6($b$) and 6($c$) are example drawings illustrating the inflow end surface of the wing of the air-flow spoiler, in accordance with an embodiment of the present invention.
Figure 6:
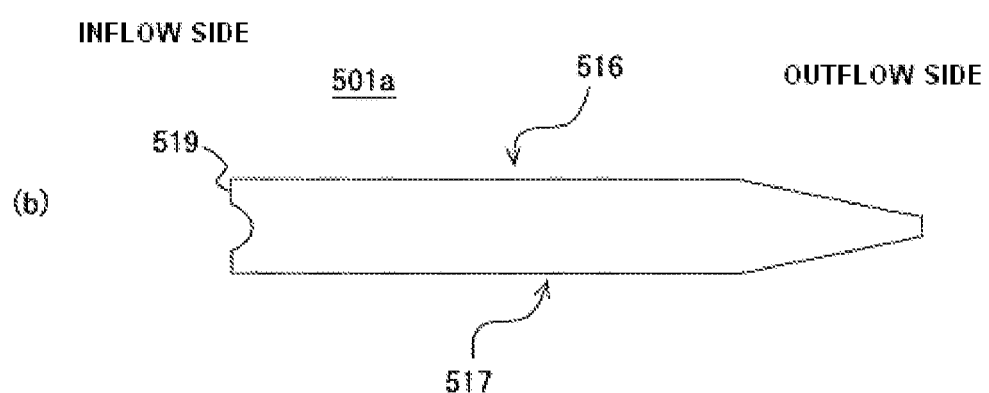
Figure 6:
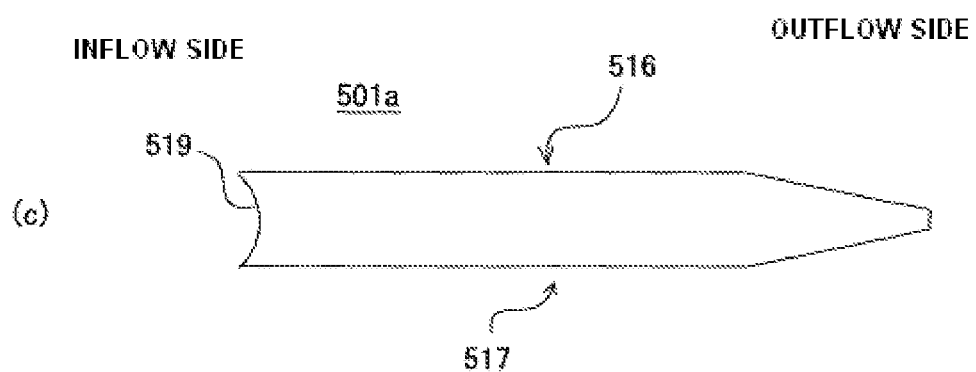

With reference now to FIGS. 6(a), 6(b) and 6(c), in accordance with embodiments of the present invention, drawings are shown of a configuration that provides a groove on the inflow end surface, which is the front end surface, of the wing 501a. FIG. 6(a) is a drawing showing the inflow end surface 519 when viewed from the lower side; and, FIG. 6(b) is a cross-sectional view cut along line B-B in FIG. 6(a). FIG. 6(c) is a cross-sectional view of the wing 501a having an inflow end surface 519 different in shape from that of FIG. 6(b). The configurations of both FIGS. 6(b) and 6(c) include a groove in the inflow end surface 519. The groove in the inflow end surface 519 may guide the airflow from the upstream toward the inside diameter and/or outside diameter of the magnetic-recording disk 101 to reduce the airflow, and associated particulate debris, entering between the wing 501a and the magnetic-recording disk 101. In FIGS. 6(a) and 6(c), the cross-sections of the grooves are arcs, but the shape of the groove is not limited to arcs. For example, the surface inside the groove may be formed by a plurality of flat surfaces, for example, a rectangular groove, or alternatively, a V-shaped groove.

The inflow end surface 519 may include a groove in a portion of the thickness as shown in FIG. 6(b), or alternatively, may include a groove in the entirety of the thickness as shown in FIG. 6(c). Moreover, in another embodiment of the present invention, the groove may be disposed along the full length in the direction from the outside diameter to the inside diameter of the magnetic-recording disk 101 when projecting the inflow end surface 519 in the direction of the airflow, which is the tangential direction at the circumference of the magnetic-recording disk. However, a groove formed in a portion of the length in the radial direction of the magnetic-recording disk in the inflow end surface 519 guides airflow toward the inside diameter and/or the outside diameter of the magnetic-recording disk 101. Whether the air flows toward the inside diameter and/or the outside diameter of the magnetic-recording disk 101 depends on the angle between the inflow end surface 519 and the airflow.

As set forth above, several examples of the air-flow spoiler 500 have been described with reference to FIGS. 1 to 6. Among the several examples, as described with reference to FIGS. 1 to 4, the air-flow spoiler 500 may provide a strong suppressive effect on particulate debris deposition onto magnetic-recording disks by the combination of the two elements of: a specific electrical property of the air-flow spoiler, and the changing thickness of the outflow end side of the wing. Moreover, in addition to these elements, either one or both of the roughness of the top surface and the undersurface of the wing described with reference to FIG. 5 and the groove in the inflow end surface described with reference to FIG. 6 may enhance the effect to suppress deposition of particulate debris onto the magnetic-recording disks. An HDD including a disk damper, which is another example of an air-flow control component, is next described.

Figure 7:
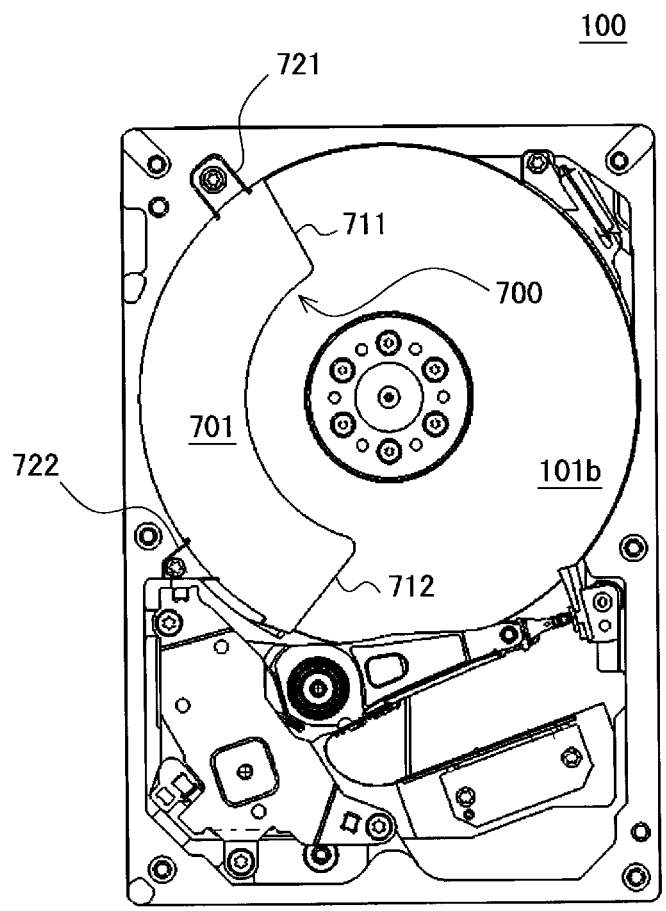
FIG. 7 is an example top view schematically depicting the configuration of a HDD having a disk damper, in accordance with an embodiment of the present invention.

With reference now to FIG. 7, in accordance with embodiments of the present invention, a plan view is shown that schematically depicts the structure of HDD 100 with a disk damper 700 mounted in HDD 100. In FIG. 7, the uppermost magnetic-recording disk 101 is omitted and the second magnetic-recording disk 101b is shown. The disk damper 700 includes a plate 700 which is interposed between magnetic-recording disks and faces recording surfaces, and two support portions 721 and 722 which support the plate 701 and are affixed to the base 102. The plate 700 spoils the airflow generated by the spin of magnetic-recording disks to damp the flutter vibration of the magnetic-recording disk.

If the HDD 100 includes three or more magnetic-recording disks, the disk damper is interposed in each space between magnetic-recording disks. Each disk damper includes a plate and support portions like the disk damper 700 shown in FIG. 7. The assembling of the HDD 100 disposes magnetic-recording disks and disk dampers alternately, which disposes each disk damper in a space between magnetic-recording disks.

In an embodiment of the present invention, the disk damper 700 includes a similar structure as the above-described spoiler 500. In other words, the material of the disk damper 700 that determines the electrical properties of the disk damper 700 is the same as that of the spoiler 500; and, the shape of the plate 701 is similar to the wings 501a to 501c. The material and shape of the spoiler 500 as described above may be applied to the material and shape of the disk damper 700. For example, the whole disk damper 700 may be made of conductive resin; and, tapered surfaces may be disposed on the top surface and the undersurface on the outflow side of the plate 701. Thus, in accordance with embodiments of the present invention, deposition of particulate debris onto the magnetic-recording disk may be suppressed. The body of the disk damper 700 may be formed by resin molding; and, the surface of the disk damper 700 may be covered by plating metal.

In addition, the plate 701 may include an end surface on the outflow end 712; the surface of the inflow end 711 of the plate 701 may include a groove; or the top surface and the undersurface of the plate 701 may be roughened. One or more of these elements of shape provided to the plate 701 may also provide suppression of deposition of particulate debris between the plate 701 and a magnetic-recording disk.

As set forth above, embodiments of the present invention have been described by way of example; but, embodiments of the present invention are not limited to the above-described examples. A person skilled in the art may easily modify, add, or convert the components in the above-described examples within the spirit and scope of embodiments of the present invention. For example, embodiments of the present invention may be applied to a disk drive including a disk other than a magnetic-recording disk.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A disk drive comprising:
   a motor configured to spin a disk;
   a base to which said motor is affixed;
   an actuator supporting a head-slider, said actuator configured to access said disk and to rotate about a pivot shaft to move said head-slider; and
   an air-flow control component affixed inside said base and disposed upstream of said actuator, comprising:
      a plate that faces a recording surface of said disk wherein a thickness of said plate gradually decreases towards an outflow side of said air-flow control component; and
      a support portion supporting said plate,
      wherein bodies of said plate and said support portion are made of resin and a surface of said plate is configured to be held at an electrical potential selected from a group consisting of ground potential and a negative potential.

2. The disk drive of claim 1, wherein said air-flow control component is made of conductive resin by integral molding.

3. The disk drive of claim 1, wherein said plate comprises an end surface connecting a plate upper surface with a plate undersurface at a rear end of said plate.

4. The disk drive of claim 1, wherein a plate upper surface and a plate undersurface of said plate comprise respective tapered surfaces that are tapered in such a manner that said thickness gradually decreases with proximity to said outflow side.

5. The disk drive of claim 1, wherein an inflow end surface of said plate comprises a groove extending in a radial direction of said disk.

6. The disk drive of claim 1, wherein a plate upper surface and a plate undersurface of said plate comprise respective roughened portions.

7. The disk drive of claim 1, wherein said support portion is disposed opposite to an outside-diameter edge of said disk and comprises an inner wall having a shape in conformity with said outside-diameter edge of said disk.

8. The disk drive of claim 1, wherein said plate and said support portion comprise a layer on respective surfaces selected from a group consisting of a plated metal layer and a coating layer configured to acquire a negative charge.

9. An air-flow control component for a disk drive, comprising:
   a plate, said plate configured to face a recording surface of a disk of said disk drive wherein a thickness of said plate gradually decreases towards an outflow side of said air-flow control component, wherein said plate is disposed upstream of an actuator of said disk drive; and
   a support portion supporting said plate; wherein bodies of said plate and said support portion are made of resin and a surface of said plate is configured to be held at an electrical potential selected from a group consisting of ground potential and a negative potential.

10. The air-flow control component of claim 9, wherein said air-flow control component is made of conductive resin by integral molding.

11. The air-flow control component of claim 9, wherein said plate comprises an end surface connecting a plate upper surface with a plate undersurface at a rear end of said plate.

12. The air-flow control component of claim 9, wherein a plate upper surface and a plate undersurface of said plate comprise respective tapered surfaces that are tapered in such a manner that said thickness gradually decreases with proximity to said outflow side.

13. The air-flow control component of claim 9, wherein an inflow end surface of said plate comprises a groove configured to extend in a radial direction of said disk.

14. The air-flow control component of claim 9, wherein a plate upper surface and a plate undersurface of said plate comprise respective roughened portions.

15. The air-flow control component of claim 9, wherein said support portion is configured to be disposed opposite to an outside-diameter edge of said disk and comprises an inner wall having a shape that is configured to conform with said outside-diameter edge of said disk.

16. The air-flow control component of claim 9, wherein said plate and said support portion comprise a layer on respective surfaces selected from a group consisting of a plated metal layer and a coating layer configured to acquire a negative charge.

* * * * *